United States Patent
Kobayashi et al.

(10) Patent No.: US 6,948,612 B2
(45) Date of Patent: Sep. 27, 2005

(54) POLYIMIDE-CONTAINING COATING COMPOSITION AND FILM FORMED FROM THE SAME

(75) Inventors: Mitsuaki Kobayashi, Tokyo (JP); Hiroshi Ayukawa, Sagamihara (JP)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 10/433,126

(22) PCT Filed: Nov. 30, 2001

(86) PCT No.: PCT/US01/45092

§ 371 (c)(1),
(2), (4) Date: May 29, 2003

(87) PCT Pub. No.: WO02/44291

PCT Pub. Date: Jun. 6, 2002

(65) Prior Publication Data

US 2004/0063899 A1 Apr. 1, 2004

(30) Foreign Application Priority Data

Nov. 30, 2000 (JP) .......................................... 2000-364781

(51) Int. Cl.[7] .............................................. B65G 15/32
(52) U.S. Cl. ................................................... 198/844.1
(58) Field of Search .............................. 198/495, 844.1, 198/846, 957; 399/101, 312, 303; 347/104

(56) References Cited

U.S. PATENT DOCUMENTS

| | | | | |
|---|---|---|---|---|
| 4,998,143 A | * | 3/1991 | Kumasaka et al. | .......... 399/101 |
| 5,661,838 A | | 8/1997 | Muehlemann et al. | |
| 6,198,899 B1 | * | 3/2001 | Takahashi et al. | .......... 399/303 |
| 6,652,938 B1 | * | 11/2003 | Nishikawa et al. | .......... 399/303 |

* cited by examiner

Primary Examiner—Kathy Matecki
Assistant Examiner—Mark A. Deuble
(74) Attorney, Agent, or Firm—Philip Y. Dahl

(57) ABSTRACT

To provide a coating composition of a soluble aromatic polyimide having good heat resistance and mechanical strength. As a soluble polyimide, a compound of the formula (I) in which R's represent independently from one another H, halogen, an alkyl group or an alkoxy group, or a substituted or unsubstituted phenyl group; A is a tetravalent aromatic group or a group of the formula (II) in which B is a covalent bond, a $>C(R^2)_2$ group, a carbonyl group, O, S, a $>SO_2$, group, a $>Si(CH_3)_2$ group, a $>Si(C_2H_5)_2$ group, a $>NR^3$ group or a bifunctional ether group in which $R^2$ is a hydrogen atom or —$C(R^4)_3$, $R^3$ is H, an alkyl group or an aryl group, and $R^4$ is H, F or Cl; Ar is an aromatic nucleus or a group of the formula (III) in which Ar and B are the same as defined above, and each p is an integer of 0 to 10; m is an integer of 1 to 10 is used. The polyimide has a weight average molecular weight of 150,000 to 1,000,000.

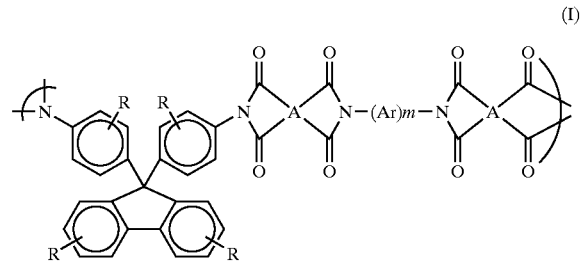

(I)

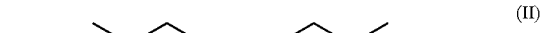

(II)

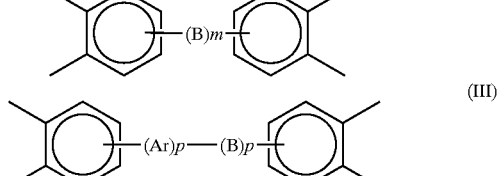

(III)

13 Claims, No Drawings

POLYIMIDE-CONTAINING COATING COMPOSITION AND FILM FORMED FROM THE SAME

FIELD OF THE INVENTION

The present invention relates to a coating composition comprising a polyimide soluble in organic solvents (soluble polyamide) and a film formed therefrom.

Polyimide is known as an egineering plastic, which has substantially constant heat resistance, electric insulation, mechanical properties such as flexibility, etc., and radiation resistance in a relatively wide temperature range from a very low temperature to a high temperature (e.g. 250 to 300° C.), and is used in aerospace industries, electric and electronic industries which lay severe conditions to materials.

The polyimide has imide bonds in the backbone, and usually prepared by the polycondensation of an acid anhydride and a diamine. In particular, an aromatic polyimide comprising an aromatic acid anhydride and an aromatic diamine has good heat resistance.

Aromatic polyimide is supplied in the form of a film or a molded article. Usually, the film and the molded article are not directly produced from the aromatic polyimide, since many aromatic polyamides do not have a clear melting point or there is no solvent suitable for dissolving the aromatic polyamides as such.

In general, a polyamic acid, which is a precursor of an aromatic polyamide is dissolved in a solvent to form a solution, and then the solution is processed to form a film and so on, as disclosed in JP-A-10-96826 and JP-A-10-171265. The solution of the precursor polyamic acid is stored and treated under dry conditions, since the polyamic acid is easily decomposed and has low storage stability. The processing of the polyamic acid solution involves heating to remove the solvent and also to convert the precursor to the aromatic polyimide through a dehydration ring-closing reaction (imidation reaction). In the imidation reaction, water is formed as a by-product. Therefore, when the drying is effected quickly, the traces of bubbles remain in the polyimide film. Thus, the above heating is often carried out over a long time.

Also, aromatic polyamides which can be soluble in the solvents after the completion of imidation (soluble aromatic polyimides) are known. The soluble aromaci polyimides are prepared using diphenylsulfone-3,3',4,4'-tetracarboxylic anhydride as an acid anhydride, and commercially available in the name of RIKACOAT from SHIN-NIPPON RIKA KABUSHIKIKAISHA.

The soluble aromatic polyimides can form an aromatic polyimide films without the imidation during the removal of the organic solvents. Although applicable to other polyimide films, the films of the soluble aromatic polyimides have low mechanical properties, in particular, tear strength if the aromatic polyimide films have good mechanical properties as well as good heat resistance, they can be widely used as intermediate transfer belts of machines such as electrophtographyic copying machines, flexible print circuits (FPC), or other structural members, electronic parts, optical parts, etc.

PROBLEMS TO BE SOLVED BY THE INVENTION

One object of the present invention is to provide a coating composition comprising a soluble aromatic polyimide which has good heat resistance and mechanical strength, and the film formed from such a soluble aromatic polyimide.

MEANS TO SOLVE THE PROBLEMS

To solve the above problem, firstly the present invention provides a coating composition comprising a polyimide soluble in organic solvents, wherein said polyimide is a compound of the formula (I):

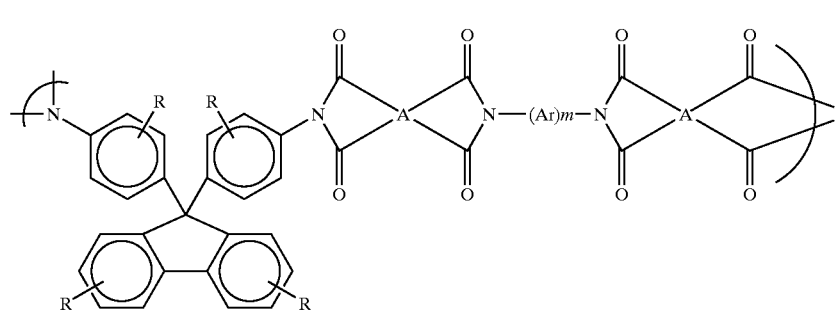

wherein R's represent independently from one another a hydrogen atom, a halogen atom, a $C_1$–$C_{10}$ alkyl group or a $C_1$–$C_{10}$ alkoxy group, a phenyl group, or a phenyl group which is substituted with 1 to 4 halogen atoms and/or $C_1$–$C_{10}$ alkyl groups;
A is a $C_6$–$C_{20}$ tetravalent aromatic group or a group of the formula (II):

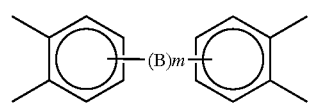

wherein B is a covalent bond, a $>C(R^2)_2$ group, a carbonyl group, an oxygen atom, a sulfur atom, a $>SO_2$ group, a $>Si(CH_3)_2$ group, a $>Si(C_2H_5)_2$ group, a $>NR^3$ group or a bifunctional ether group in which $R^2$ is a hydrogen atom or $C(R^4)_3$, $R^3$ is a hydrogen atom, a $C_1$–$C_{20}$ alkyl group or a $C_6$–$C_{20}$ aryl group, and $R^4$ is a hydrogen atom, a fluorine atom or a chlorine atom; Ar is a monocyclic or polycyclic $C_6$–$C_{20}$, aromatic nucleus or a group of the formula (III):

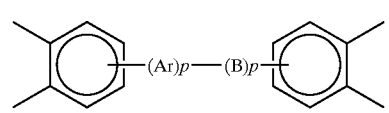

wherein Ar and B are the same as defined above, and each p is an integer of 0 to 10; m is an integer of 1 to 10, and said polyimide has a weight average molecular weight of 150,000 to 1,000,000 in terms of a polystyrene molecular weight measured with gel permeation chromatography.

Secondly, the present invention provides a coating composition comprising a polyimide soluble in organic solvents, wherein said polyimide is a polycondensate polymer of 3,3',4,4'-biphenyltetracarboxylic dianhydride,
a diamine having an aromatic ether group,
a 9,9-bis (4-amylaryl) fluorene, znc optionally pyromellitic dianhydride (1,2,4,5-benzenetetracarboxylic dianhydride), and said polyimide has a weight average molecular weight of 150,000 to 1,000,000 in terms of a polystyrene molecular weight measured with gel permeation chromatography.

Thirdly, the present invention provides a film formed from the above coating composition of the present invention.

EMBODIMENTS TO CARRY OUT THE INVENTION

Hereinafter, the coating composition of the present invention and a film formed therefrom will be explained by making reference to preferred embodiments, but they do not limit the scope of the present invention.

The coating composition of the present invention is prepared by dissolving the soluble polyimide in an organic solvent. The polyimide is the aromatic polyimide having a plurality of pendant fluorene structural units, as represented by the formula (I). The pendant fluorene structural units allow the polyimide to be dissolved in the organic solvent.

The chemical structure of the formula (I) will be explained in detail.

The four R groups included in one repeating unit are independent from one another. That is, they may be the same or different. Each R is a hydrogen atom, a halogen atom, a $C_1$–$C_{10}$ alkyl group or a $C_1$–$C_{10}$ alkoxy group a phenyl group, or a phenyl group which is substituted with 1 to 4 halogen atoms and/or $C_1$–$C_{10}$ alkyl groups.

m is an integer of 1 to 10.

Raw materials corresponding to the polyamide having such a chemical structure may be commercially available or can be easily synthesized.

A is a $C_1$–$C_{20}$ tetravalent aromatic group or a group of the above formula (II).

In the formula (II), B is a covalent bond, a $>C(R^2)_2$ group, a carbonyl group, an oxygen atom, a sulfur atom, a $>SO_2$ group, a $>Si (CH_3)_2$ group, a $>Si(C_2H_5)_2$ group, a $>NR_3$ group, or a bifunctional ether group (e.g. a group derived from a dihydric phenol such as bisphenol A, from the phenolid hydroxyl groups of which hydrogen atoms are removed). In these groups, $R^2$ is a hydrogen atom or —C $(R^4)_3$, $R^3$ is a hydrogen atom, a $C_1$–$C_{20}$ alkyl group or a $C_6$–$C_{20}$ aryl group, and $R^4$ is a hydrogen atom, a fluorine atom or a chlorine atom.

Ar in the formula (I) is a monocyclic or polycyclic $C_6C_{20}$, aromatic nucleus or a group of the formula (III). Two suffixes p in the formula (III) are the same or different, and each p is an integer of 0 to 10.

The weight average molecular weight of the soluble aromatic polyimide of the formula (I) is from 150,000 to 1,000,000, preferably from 200,000 to 600,000, in terms of a polystyrene molecular weight measured with gel permeation chromatography (GPC). When, the molecular weight is less than 150,000, the produced film has low mechanical strength. When the molecular weight exceeds 1,000,000, a solution having a suitable concentration may not be prepared.

In the present invention, a preferable aromatic carboxylic anhydride constituting the soluble aromatic polyimide is 3,3',4,4'-biphenyltetracarboxylic dianhydride. Thus, the residue derived from such a dianhydride preferably constitutes the group A, since such a group can impart good elasticity to the film or sheet formed from the soluble aromatic polyimide. 3,3',4,4'-Biphenyltetracarboxylic dianhydride is commercially available under the trade name of s-BPDA from Ube Industries, Ltd.

Preferably, pyromellitic dianhydride is used as a further aromatic carboxylic anhydride. The use of pyromellitic dianhydride decreases the elastic modulus of the film or sheet of the aromatic polyimide, and thus the elastic modulus of the film or sheet can be adjusted in accordance with the applications of the film or sheet.

The diamine which constitutes the soluble aromatic polyimide preferably has an aromatic ether functional group and in turn, such a functional group constitutes $(Ar)_m$, from the viewpoint of the flexibility of the film or sheet formed from the soluble aromatic polyimide. In particular, when the diamine is diaminodiphenyl ether (ODA) or 1,3-bis(4-aminophenoxy)benzene, it can impart flexibility to the film or sheet without deteriorating the durability of the polyimide.

The fluorene is usually 9,9-bis(4-aminoaryl)fluorene, preferably 9,9-bis(4-aminophenyl)fluorene (BAF) or 9,9bis (4-amiono-3-methylphenyl)fluorene (OTBAF), since they can be relatively easily available.

The soluble aromatic polyimide may be prepared as follows:

The acid anhydride, the diamine and the fluorene derivative are mixed in a specific molar ratio. Then, the mixture is stirred at room temperature for a specific time to form a polyamic acid. Next, the polyamic acid is imidated with acetic anhydride and preferably absolute (dry) pyridine. More in detail, acetic anhydride and anhydrous pyridine are added to the polyamic acid to form a solution. Then, the solution is heated at 120° to 140° C. while stirring to obtain the aromatic polyimide. Then, the aromatic polyimide is cooled to about 25° C. followed by purification with tetrahydrofuran (THF) and water.

When THF is used, it is possible to isolate high purity aromatic polyimide having a high molecular weight and a saturation solubility in TBF of 50 g/liter or less, preferably 10 g/liter or less, from the unreacted monomers, low molecular weight aromatic polyimide and an imidization catalyst used.

Subsequently, the purified aromatic polyimide is dried to obtain the powder product.

The polyimide, which is produced as described above, has good heat resistance due to its aromatic nature. In addition, the aromatic polyimide is hardly decomposed since the imidization is completed. As a result, it is not necessary to store or treat the aromatic polyimide under dry conditions.

In general, the aromatic polyimide is dissolved in the organic solvent to prepare the coating composition. The inorganic solvent is not limited in the present invention. Preferred examples of the organic solvent include organic polar solvents such as N-methylpyrrolidone (NMP), 1,3-dimethyl-2-imidazolidinone, dimethylsulfoxide, N,N,N',N', N",N"-hexamethylphosphorylamide.

When A is the group of the formula (II) in which B is a bifunctional ether group, the aromatic polyimide can be dissolved in an amide solvent (e.g. N,N-dimethylformamide (DMF), N,N-dimethylacetoamide, etc.) or an ether solvent (e.g. tetrahydrofiran (THF), dioxane, cyclopentanone, cyclohexanone, etc.).

The concentration of the aromatic polyimide in the coating composition may be suitable adjusted according to the thickness of the film or sheet formed. Typically, 8 to 20 parts by weight of the aromatic polyimide is dissolved in 92 to 80 parts by weight of the organic solvent. When the amount of the aromatic polyimide dissolved is less than 8 parts by weight, it is necessary to thickly apply the coating composition to form the film or sheet having a desired thickness, and thus it takes a long time to dry the applied composition. on the other hand, it is very difficult to dissolve more than 20 parts by weight of the aromatic polyimide.

The coating composition can be applied on a substrate with a coating means such as a knife coater at a desired thickness, and then the organic solvent is removed by heating and drying to form a heat resistant film. In the formation of the film, the heating and drying time of the applied solution can be shortened when the soluble aromatic polyimide according to the present invention is used, since the imidation of the aromatic polyimide is completed as explained above, and thus the undesirable by-products (for example, water), which should be removed together with the organic solvent, are not generated. In particular, in the case of the coating composition comprising the aromatic polyimide and the organic polar solvent, the heating and drying of the applied composition can be completed in a relatively short time, and thus such a composition is suitable for substrates having low heat resistance (for example, electronic parts such as FPC, or optical parts).

According to the present invention, the film of the polyimide has good mechanical properties such as tear strength, elastic modulus, etc. In particular, the tear strength is rather high. When the film thickness is in the range between 40 and 150 μm, a tear strength of 160 to 490 N/mm, preferably 185 to 490 N/mm, more preferably 190 to 490 N/mm is achieved. Thus, the film can be advantageously used as, for example, a conveying belt.

When conductive fillers such as metal oxides, carbon black, etc. are uniformly dispersed in the coating composition of the present invention, a conductive film having a volume resistivity of $10^8$ to $10^{12}$ Ωcm can be obtained.

When such a film is formed in the form of a seamless product (that is, a loop form), it can be used as an intermediate transfer belt or a fixing belt used in the electrophtographyic copying machines. Particularly in such applications, the thickness of the film is usually from 50 to 150 μm, preferably from 70 to 130 μm. When the film thickness is less than the lower limit, the film has insufficient strength. When the film thickness exceeds the upper limit, the film has low flexibility. The film having such a thin thickness can produce a belt having sufficient strength.

The present invention has been explained by making reference to the preferred embodiments, but the invention is not limited to those embodiments.

For example, the acid anhydride as the raw material of the polyimide is not limited to 3,3',4,4'-biphenyltetracarboxylic dianhydride, and any other carboxylic anhydrides may be used insofar as they are aromatic ones. Examples of other acid anhydrides include pyromellitic anhydride, bis(phthalic anhydride)sulfone, bis(phthalic anhydride) ether, 2,2-bis(phenoxyphthalic anhydride)propane, 1,1,1,3,3,3-hexafluoropropane-2,2bis(phthalic anhydride), 2,3,3',4'-biphenylte tracarboxylic dianhydride, benzophenonetetracarbocylic dianhydride, etc.

Also, the diamine is not limited to the diamine having the aromatic ether group, and any other diamines may be used insofar as they are aromatic ones. Examples of the other diamines include bis(4-aminophenyl)methane, 2,2-bis(4-aminophenyl)propane, phenylenediamine, bis(4-aminophenyl)sulfone, etc.

Furthermore, the fluorene is not limited to 9,9-bis(4-aminoaryl)fluorene, and any other fluorene derivatives may be used insofar as they are bifunctional ones. Examples of the other fluorene derivatives include 9,9-bis(4-aminophenoxyphenyl)fluorene, etc.

The present invention will be illustrated by the following Examples, which do not limit the scope of the invention in any way.

EXAMPLE 1

Synthesis of Aromatic Polyimide

In a vessel placed in a nitrogen atmosphere, 34.85 g of 9,9-bis(4-aminophenyl)fluorene (BAF), 20.02 g of 3,4'diaminodiphenyl ether (3,4'-ODA) (available from WAKAYAMA SEIKA KABUSHIKIKAISHA and 58.83 g of 3,3',4,4'-biphenyltetracarboxylic dianhydride (s-BPDA) (available from Ube Industries, Ltd.) were mixed to prepare a solution, which was stirred at about 25° C. for 21 hours. Then, 81.3 g of acetic anhydride and 63.3 g of absolute pyridine were dropwise added to the vessel. Thereafter, the vessel was heated on an oil bath at 120 to 140° C. for 2 hours while stirring the solution.

Subsequently, the solution was cooled to about 25° C., and dropwise added to 3 liters of THF to obtain a precipitate. The precipitate was once isolated from THF by decantation, washed with water, immersed in 1.5 liters of TEY for 18 hours, and again isolated from THF by decantation.

The isolated precipitate was heated and dried in an oven at about 100° C. for 18 hours to obtain a powdery aromatic polyimide.

The weight average molecular weight of the obtained aromatic polyamide was measured with gel permeation chromatography, and was about 290,000 in terms of the polystyrene molecular weight.

Production of Aromatic Polyimide Film

Ten (10) grams of the powdery aromatic polyimide obtained in the above step was dissolved in 90 g of N-methylpyrrolidone (NMP) to obtain a coating composition containing 10% by weight of the aromatic polyimide. The coating composition was applied on a substrate consisting of a film manufactured by DuPont (CAPTON®) with a knife coater having a gap length of 800 μm. Then, the substrate carrying the applied coating composition was placed in an oven and heated and dried at about 100° C. for 18 hours to obtain an aromatic polyimide film having a thickness of about 75 μm. Then, the substrate and the polyimide film carried thereon were heated in an oven at about 250° C. for 30 minutes to remove substantially all the solvent.

Evaluation of Aromatic Polyimide Film

The aromatic polyimide film was peeled off from the substrate and its tear strength was measured according to JIS K 7128-3.

The tear strength of the film of this Example was 265 N/mm.

EXAMPLE 2

An aromatic polyimide was synthesized, and a film was produced therefrom and evaluated in the same manner as in Example 1 except that 52.26 g of BAS, 10.01 g of 3,4'-ODA and 58.84 g of s-BPDA were used. The polyimide had a weight average molecular weight was about 250,000 in terms of a polystyrene molecular weight measured with gel permeation chromatography, and the film had a tear strength of 167 N/mm.

An aromatic polyimide was synthesized in the same manner as in Example 1 except that 1306.5 g of BAF, 365.5 g of TPE-R and 1471.1 g of s-BPDA were used. The polyimide had a weight average molecular weight was about 260,000 in terms of a polystyrene molecular weight measured by gel permeation chromatography. A film was produced from this polyimide and evaluated. It had a tear strength of 216 N/mm.

EXAMPLE 4

The powdery aromatic polyimide prepared in Example 3 (50 g) was dissolved in 450 g of NMP to obtain a coating composition containing 10% by weight of the aromatic polyimide. Then, the coating composition was uniformly applied with a knife coater having a gap length of 900 μm on an inner wall surface of a hollow cylinder of stainless steel having an inner diameter of 438 mm and a width of 50 mm. Then, the cylinder carrying the coating composition applied was dried with a hot air using a drier at about 80° C. for 8 hours to obtain a seamless film (or an endless loop film).

Then, the seamless film was removed from the hollow cylinder and heated at about 250° C. for 30 minutes to remove substantially all the solvent. The heated seamless film had a thickness of about 75 μm. The tear strength of the seamless film was 235 N/mm when measured according to JIS F 7128-3.

EXAMPLE 5

A heated seamless film was produced in the same manner as in Example 4 except that a coating composition was prepared by dissolving and dispersing 30 g of the powdery polyamide and conductive titanium oxide (FT2000 manufactured by ISHIARA SANGYO KAISHA, LTD.) in 270 g of NMP. The tear strength of the seamless film was 167 N/mm when measured according to JIS K 7128-3.

Comparative Example 1

A film was prepared and evaluated in the same manner as in Example 1 except that a solution of a polyamide (RIACOAT SN 20 (trade name) manufactured by SHIN-NIPPON RIKA KABUSHIKIKAISHA, L weight average molecular weight of about 130,000 in terms of a polystyrene molecular weight measured by gel permeation chromatography) The tear strength of the film was 147 N/mm.

Effects of the Invention

The coating composition of the present invention can be dried in a relatively short time, and molded products such as a film or a sheet produced therefrom have good heat resistance and mechanical strength, in particular, tear strength.

What is claimed is:

1. A seamless conveying belt comprising a polyimide soluble in organic solvents, wherein said polyimide is a compound of the formula (I):

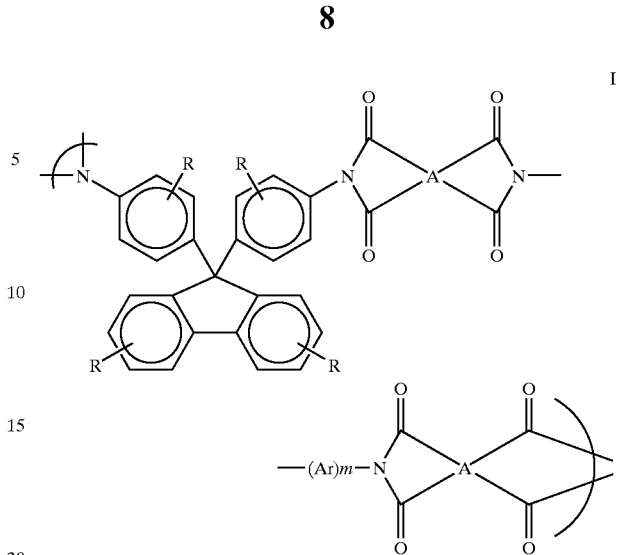

wherein R's represent independently from one another a hydrogen atom, a halogen atom, a $C_1$–$C_{10}$ alkyl group or a $C_1$–$C_{10}$ alkoxy group, a phenyl group, or a phenyl group which is substituted with 1 to 4 halogen atoms and/or $C_1$–$C_{10}$ alkyl groups;

A is a $C_6$–$C_{20}$ tetravalent aromatic group or a group of the formula (II):

wherein B is a covalent bond, a >C($R^2$)$_2$ group, a carbonyl group, an oxygen atom, a sulfer atom, a >SO$_2$ group, a >Si(CH$_3$)$_2$ group, a >Si(C$_2$H$_5$)$_2$ group, a >NR$^3$ group or a bifunctional ether group in which $R^2$ is a hydrogen atom or C($R^4$)$_3$, $R^3$ is a hydrogen atom, a $C_1$–$C_{20}$ alkyl group or a $C_6$–$C_{20}$ aryl group, and $R^4$ is a hydrogen atom, a flourine atom or a chlorine atom;

Ar is a monocyclic or polycyclic $C_6$–$C_{20}$ aromatic nucleus or a group of the formula (III):

wherein Ar and B are the same as defined above, and each p is an integer of 0 to 10;

m is an integer of 1 to 10, and said polyimide has a weight average molecular weight of 150,000 to 1,000,000 in terms of a polystyrene molecular weight measured with gel permeation chromatography.

2. A seamless conveying belt comprising a polyimide soluble in organic solvents, wherein said polyimide is a polycondensate polymer of 3,3',4,4'-biphenyltetracarboxylic dianhydride, a diamine having an aromatic ether group, and 9,9-bis(4-amylaryl)fluorene, and said polyimide has a weight average molecular weight of 150,000 to 1,000,000 in terms of a polystyrene molecular weight measured with gel permation chromatography.

3. The seamless conveying belt according to claim 1, wherein a saturation solubility of said polyimide in tetrahydrofuran is 50 g/liter or less.

4. The seamless conveying belt according to claim 2, wherein a saturation solubility of said polyimide in tetrahydrofuran is 50 g/liter or less.

5. The seamless conveying belt according to claim 2, wherein said polyimide further comprises pyromellitic dianhydride as a monomer.

6. The seamless conveying belt according to claim 2, wherein said diamine is at least one diamine selected from the group consisting of diaminodiphenyl ether and 1,3-bis(4-aminophenoxy)benzene.

7. The seamless conveying belt according to claim 2, wherein said 9,9-bis(4-aminoaryl)fluorene is at least one fluorene derivative selected from the group consisting of 9,9-bis(4-aminophenyl)fluorene and 9,9-bis(4-amiono-3methylphenyl)fluorene.

8. The seamless conveying belt according to claim 1 additionally comprising conductive fillers.

9. The seamless conveying belt according to claim 2 additionally comprising conductive fillers.

10. The seamless conveying belt according to claim 9 having a volume resistivity of $10^8$ to $10^{12}$ ohm·cm.

11. The seamless conveying belt according to claim 9 having a volume resistivity of $10^8$ to $10^{12}$ ohm·cm.

12. The seamless conveying belt according to claim 1, which has a tear strength of 160 to 490 N/mm according to JIS K 7128-3.

13. The seamless conveying belt according to claim 2, which has a tear strength of 160 to 490 N/mm according to JIS K 7128-3.

* * * * *

UNITED STATES PATENT AND TRADEMARK OFFICE
CERTIFICATE OF CORRECTION

PATENT NO. : 6,948,612 B2
DATED : September 27, 2005
INVENTOR(S) : Kobayashi et al.

It is certified that error appears in the above-identified patent and that said Letters Patent is hereby corrected as shown below:

Column 2,
Line 3, after "strength" insert -- , --.

Column 3,
Line 43, delete "$C_1$-$C_{20}$" and insert -- $C_6$-$C_{20}$ --.
Line 55, delete "$C_6C_{20}$" and insert -- $C_6$-$C_{20}$ --.
Line 63, after "When" delete ",".

Column 4,
Line 45, delete "TBF" and insert -- THF --.

Column 5,
Line 1, delete "tetrahydrofiran" and insert -- tetrahydrofuran --.
Line 11, after "composition" delete "." and insert -- , --.

Column 6,
Line 18, after "KABUSHIKIKAISHA" insert -- ) --.
Line 28, delete "TEY" and insert -- THF --.
Line 43, delete "CAPTON®" and insert -- CAPTON® --.

Column 7,
Line 41, delete "ISHIARA" and insert -- ISHIHARA --.
Line 51, delete "RIACOAT" and insert -- RIKACOAT --.

UNITED STATES PATENT AND TRADEMARK OFFICE
CERTIFICATE OF CORRECTION

PATENT NO. : 6,948,612 B2
DATED : September 27, 2005
INVENTOR(S) : Kobayashi et al.

It is certified that error appears in the above-identified patent and that said Letters Patent is hereby corrected as shown below:

Column 8,
Line 36, delete "sulfer" and insert -- sulfur --.
Line 42, delete "flourine" and insert -- fluorine --.

Column 9,
Line 1, delete "permation" and insert -- permeation --.

Column 10,
Line 2, delete "3methylphenyl" and insert -- 3-methylphenyl --.

Signed and Sealed this

Seventeenth Day of January, 2006

JON W. DUDAS
*Director of the United States Patent and Trademark Office*